(12) United States Patent
Gao et al.

(10) Patent No.: US 11,569,762 B2
(45) Date of Patent: Jan. 31, 2023

(54) MOTOR TRACKING ERROR REDUCTION METHOD AND IMPLEMENTATION DEVICE BASED ON MICRO-DRIVE UNIT

(71) Applicant: GUANGDONG UNIVERSITY OF TECHNOLOGY, Guangzhou (CN)

(72) Inventors: Jian Gao, Guangzhou (CN); Jindi Zhang, Guangzhou (CN); Yuheng Luo, Guangzhou (CN); Lingwei Tan, Guangzhou (CN); Lanyu Zhang, Guangzhou (CN); Xin Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 241 days.

(21) Appl. No.: 16/950,062

(22) Filed: Nov. 17, 2020

(65) Prior Publication Data
US 2022/0060125 A1 Feb. 24, 2022

(30) Foreign Application Priority Data
Aug. 24, 2020 (CN) .......................... 202010856121.1

(51) Int. Cl.
*H02N 2/06* (2006.01)
*G05B 19/19* (2006.01)
(52) U.S. Cl.
CPC ............... *H02N 2/06* (2013.01); *G05B 19/19* (2013.01)
(58) Field of Classification Search
CPC .......... H02N 2/06; H02N 2/025; H02N 2/062; H02P 23/14; G05B 19/19; G05B 19/351; G05B 2219/37109; G05B 2219/37177; G05B 2219/41344; G05B 2219/41345
See application file for complete search history.

(56) References Cited

U.S. PATENT DOCUMENTS

| 10,222,608 B2 | 3/2019 | Iwase et al. |
| 2012/0025113 A1 | 2/2012 | Stadelbauer et al. |
| 2017/0087677 A1* | 3/2017 | Yang ................ B23Q 11/0039 |
| 2017/0335939 A1 | 11/2017 | Iwaki et al. |

FOREIGN PATENT DOCUMENTS

| CN | 107342653 A | 11/2017 |
| CN | 110788846 A | 2/2020 |

\* cited by examiner

*Primary Examiner* — Emily P Pham

(57) ABSTRACT

The present disclosure relates to the technical field of mechanical precision manufacturing, in particular to a motor tracking error reduction method and an implementation device based on a micro-drive unit. A motor tracking error reduction method based on micro-drive unit includes: providing a motor mover as the working output end, and feeding back the position information of the motor mover to the micro-drive controller in real time by the sensor; controlling the micro-drive unit to compensate the displacement of the motor mover by the micro-drive controller; correcting the tracking error of the motor mover after the displacement compensation, and feeding back the tracking error information after correction to the motor controller. The error reduction method and implementation device in the present disclosure reduce the motor tracking error and solve the problem of coupling interference. In addition, the single position feedback is used to reduce the production cost.

10 Claims, 4 Drawing Sheets providing a motor rotor as an working output end, and feeding back a position information of the motor rotor to a micro-drive controller in real time by a sensor 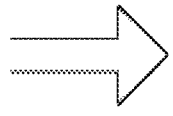 controlling, by the micro-drive controller, a micro-drive unit to carry out a displacement compensation for the motor rotor 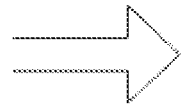 correcting a tracking error of the motor rotor after the displacement compensation, and feeding back the corrected tracking error information to a motor controller

FIG. 1

MOTOR TRACKING ERROR REDUCTION METHOD AND IMPLEMENTATION DEVICE BASED ON MICRO-DRIVE UNIT

CROSS REFERENCES TO RELATED APPLICATIONS

The present application claims foreign priority of Chinese Patent Application No. 202010856121.1, filed on Aug. 24, 2020 in the State Intellectual Property Office of China, the disclosures of all of which are hereby incorporated by reference.

TECHNICAL FIELD

The present disclosure relates to the technical field of mechanical precision manufacturing, in particular to a motor tracking error reduction method and an implementation device based on a micro-drive unit.

BACKGROUND

With the progress of science and technology, the performance of products is improving, and the requirements of processing accuracy of corresponding products are also higher and higher. Wherein, the motor is widely used in various manufacturing and processing equipment, such as laser cutting machine, machine tool, semiconductor manufacturing equipment and so on.

At present, due to the uncertainty of mechanical/electrical parameters, thrust fluctuation, nonlinear friction and other problems in the motor system, the position tracking error is large in the process of motor motion. In the existing equipment, the stroke of high-precision micro motion platform is generally short, and the precision of ordinary macro motion equipment with large stroke can not meet the actual demand. If the special large stroke high-precision motion equipment is used, the manufacturing cost of the product will be greatly increased. Therefore, the method of combining general precision macro motion with high-precision small stroke micro motion is mainly used to realize large stroke and high-precision feeding, so as to reduce tracking error.

However, in the existing technology, micro motion is used as the output working end to achieve high tracking accuracy. The workpiece is placed on the micro motion part, and after the micro motion part reaches the expected location, the controller drives the micro motion part to compensate for the displacement movement of the macro motion part, but the tracking error of the motor mover in this compensation method does not reduce. At the same time, the macro and micro motion system needs dual position feedback, which will increase the detection cost of absolute sensor. In addition, in practical application, for the feeding of large workpiece, the workpiece is placed on the micro motion platform, and the mass of micro motion part can not be ignored. When micro motion is used for displacement compensation, the coupling interference is difficult to eliminate for macro motion, which increases the complexity of macro motion controller and deteriorates the trajectory accuracy.

SUMMARY

The present disclosure is to provide a motor tracking error reduction method and its implementation device based on micro-drive unit, which is aimed at the problems of large motor tracking error and coupling interference in the prior art.

A motor tracking error reduction method based on micro-drive unit, including:

providing a motor mover as an working output end, and feeding back a position information of the motor mover to a micro-drive controller in real time by a sensor;

controlling, by the micro-drive controller, a micro-drive unit to carry out displacement compensation for the motor mover;

correcting a tracking error of the motor mover after the displacement compensation, and feeding back the corrected tracking error information to a motor controller.

Alternatively, the step of controlling, by the micro-drive controller, a micro-drive unit to carry out displacement compensation for the motor mover includes the specific steps as following: determining a driving direction and a driving amount of the micro-drive unit, and the micro-drive unit includes a piezoelectric actuator, and extending or shortening a length of the piezoelectric actuator to carry out the displacement compensation to the motor mover according to the determined driving direction and the driving amount.

Alternatively, the driving amount is calculated by a following formula:

$$D_i = \begin{cases} 0, & \text{if } i = 1 \\ D_{i-1} + e_i, & \text{if } i \neq 1 \text{ and } (D_{min} - D_{i-1}) \leq e_i \leq (D_{max} - D_{i-1}) \\ D_{max}, & \text{if } i \neq 1 \text{ and } e_i \geq (D_{max} - D_{i-1}) \\ D_{min}, & \text{if } i \neq 1 \text{ and } e_i \leq (D_{min} - D_{i-1}) \end{cases}$$

wherein, $D_i$ i s the i-th driving of the micro-drive unit to the motor mover, $e_i$ is the sampling error of the i-th transmission cycle, $D_{max}$ is the maximum driving amount of the micro-drive unit to the motor mover, and $D_{min}$ is the minimum driving amount of the micro-drive unit to the motor mover.

Alternatively, the step of correcting the tracking error of the motor mover after the displacement compensation includes $$E_i(e_i) = \begin{cases} e_i & i \leq 2 \\ e_i + D_{i-2} & i > 2 \end{cases}$$

wherein, $E_i(e_i)$ is the corrected feedback error of the motor controller in the i-th transmission cycle.

An implementation device of motor tracking error reduction method based on micro-drive unit, including a base, a micro-drive unit, a motor assembly, a micro-drive controller connected to the micro-drive unit, a motor controller connected to the motor assembly and a sensor installed on the base, the micro-drive unit and the motor assembly are both arranged on the base;

the motor assembly includes a motor mover, wherein a workpiece is placed on the the motor mover, and the sensor is configured to feed back a position information of the motor mover to the micro-drive controller;

the micro-drive controller controls the micro-drive unit to carry out a displacement compensation of the motor mover, and feeds back the compensated tracking error of the motor controller to the motor controller.

Alternatively, the micro-drive unit includes a piezoelectric actuator, an elastic component and an auxiliary mass block, the elastic component is arranged between the motor mover and the auxiliary mass block, the piezoelectric actuator is respectively connected to the motor mover and the auxiliary mass block, and the piezoelectric actuator is configured for displacement compensation of the motor mover.

Alternatively, the sensor is an absolute grating ruler.

Alternatively, the motor assembly further includes a guide rail, a sliding block and a motor stator, the sliding block is slidably installed on the guide rail, and the motor mover and the micro-drive unit are arranged on the sliding block.

Alternatively, the base is further provided with an absolute grating encoder.

Alternatively, the piezoelectric actuator is a piezoelectric ceramic actuator.

Compared with the prior art, the embodiment of the present disclosure has the following advantageous effects:

The present disclosure takes the motor mover as the working output end, and after the position information of the motor mover is feed back to the micro-drive controller in real time, the micro-drive controller controls the micro-drive unit to compensate the displacement of the motor mover, and corrects the tracking error after the displacement compensation of the motor mover, and the tracking error feed back to the motor controller is corrected. The application realizes the decrease of tracking error and solves the problem of coupling interference. At the same time, the single position feedback is used to reduce the production cost.

BRIEF DESCRIPTION OF THE DRAWINGS

In order to more clearly illustrate the embodiment of the present disclosure or the technical solution in the prior art, the following will briefly introduce the drawings needed in the embodiment or prior art description. Obviously, the drawings described below are only some embodiments of the present disclosure. For ordinary skilled person in the art, without paying creative labor, they can also obtain other drawings based on these drawings.

FIG. 1 is a flow chart of the motor tracking error reduction method based on the micro-drive unit provided in the first embodiment of the present disclosure;

Illustration: 1—micro—drive unit; 11—auxiliary mass block; 12—elastic component; 13—piezoelectric actuator; 2—motor assembly; 21—motor mover, 22—motor stator, 23—sensor, 24—guide rail, 25—absolute grating encoder; 3—base.

DETAILED DESCRIPTION OF THE EMBODIMENTS

In order to make the objective, features and advantages of the present disclosure more obvious and easy to understand, the technical solution in the embodiment of the present disclosure will be described clearly and completely in combination with the drawings in the embodiment of the present disclosure. Obviously, the embodiments described below are only part of the embodiments of the disclosure, not all the embodiments. Based on the embodiment of the present disclosure, all other embodiments obtained by ordinary skilled person in the art without creative labor belong to the scope of the present disclosure.

In the description of the present disclosure, it should be understood that when a component is considered to be "connect to" another component, it may be directly or indirectly connected to another component. When a component is considered to be "provided on" another component, it can be directly or indirectly provided on another component.

In addition, the terms "long", "short", "inside" and "outside" indicate the orientation or position relationship based on the attached drawings, which are only for the convenience of describing the present disclosure, rather than indicating or implying that the device or original device referred to must have such a specific orientation and operate in a specific orientation structure, which cannot be understood as a limitation of the present disclosure.

The technical solution of the present disclosure will be further described in combination with the drawings and specific embodiments.

Embodiment 1

Figure 2:
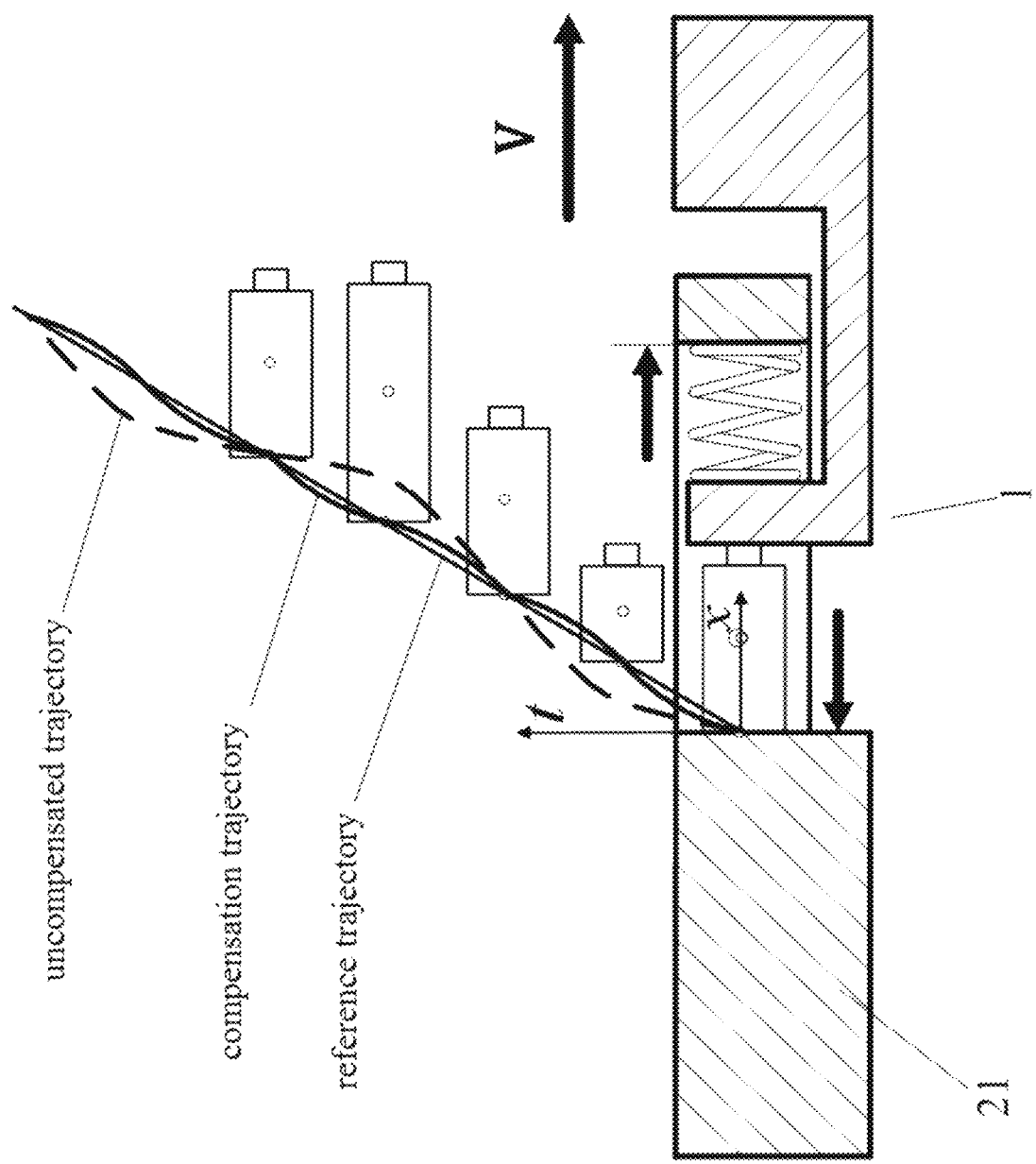
FIG. 2 is a schematic diagram of the compensation principle of the micro-drive unit provided by the first embodiment of the present disclosure.
Figure 3:
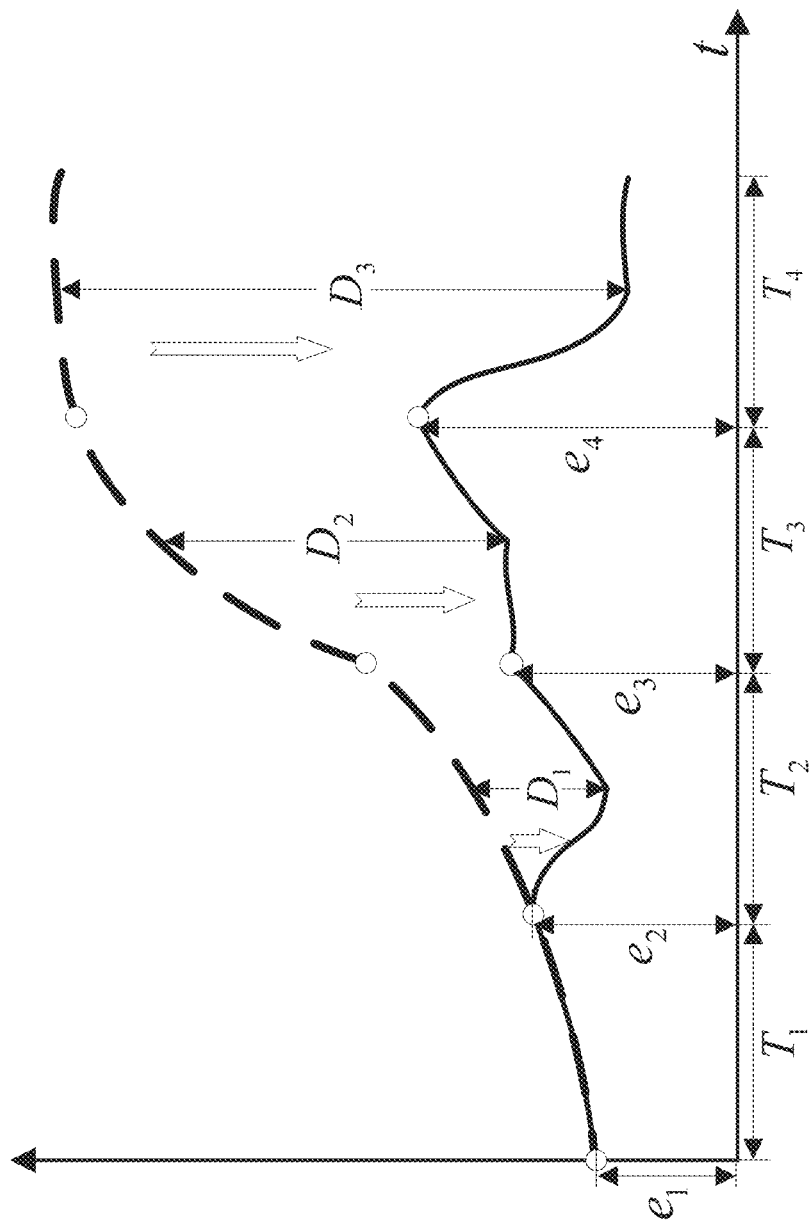
FIG. 3 is a diagram showing of the tracking error variation provided by the first embodiment of the present disclosure.

Referring to FIG. 1 to FIG. 3, a motor tracking error reduction method based on micro-drive unit is provided by the present embodiment, wherein the method includes the following steps: providing a motor mover as an working output end, and feeding back a position information of the motor mover to a micro-drive controller in real time by a sensor; controlling, by the micro-drive controller, a micro-drive unit to carry out displacement compensation for the motor mover; correcting a tracking error of the motor mover after the displacement compensation, and feeding back the corrected tracking error information to a motor controller.

Specifically, In this embodiment, the workpiece can be placed on the motor mover, and the motor mover is taken as the working output end. This method can directly reduce the tracking error of the motor mover. After the position information of the motor mover is feed back by the sensor, the micro-drive controller drives the micro-drive unit to carry out displacement compensation according to the feedback information. Since the displacement compensation will affect an appropriate control amount outputted by the motor controller, in order to avoid the interference of the displacement compensation on the motor controller, the tracking error of the compensated motor mover is corrected. Finally, the corrected tracking error is feed back to the motor controller to drive the motor assembly.

In the specific operation, the micro-drive unit is controlled to carry out the displacement compensation of the motor mover by the micro-drive controller and it is necessary to determine the driving direction and the driving amount of the micro-drive unit. In an optional embodiment, the micro-drive unit includes a piezoelectric actuator, and the length of the piezoelectric actuator is extended or shortened according to the determined driving direction and driving amount to carry out the displacement compensation of the motor mover. Electrical energy and mechanical energy can be directly converted by the piezoelectric actuator. When the voltage is changed, it can be extended or shortened to achieve sub-nanometer motion, so high-precision motion can be achieved, and the compensation work output can achieve a higher position accuracy. Specifically, the driving amount of the micro-drive unit is determined by using the following formula:

$$D_i = \begin{cases} 0, & \text{if } i = 1 \\ D_{i-1} + e_i, & \text{if } i \neq 1 \text{ and } (D_{min} - D_{i-1}) \leq e_i \leq (D_{max} - D_{i-1}) \\ D_{max}, & \text{if } i \neq 1 \text{ and } e_i \geq (D_{max} - D_{i-1}) \\ D_{min}, & \text{if } i \neq 1 \text{ and } e_i \leq (D_{min} - D_{i-1}) \end{cases}$$

Wherein, $D_i$ is the i-th driving of the micro-drive unit to the motor mover, is the sampling error of the i-th transmission cycle, $D_{max}$ is the maximum driving amount of the micro-drive unit to the motor mover, and $D_{min}$ is the minimum driving amount of the micro-drive unit to the motor mover.

Referring to FIG. 2, it is a compensation schematic diagram of micro-drive unit, the uncompensated trajectory is the actual motion track of the motor mover without compensation, and the reference trajectory is the ideal motion track of the motor mover without tracking error. The driving direction and the driving amount in the next transmission cycle can be determined by the difference between the reference trajectory and the compensation trajectory in the current transmission cycle, and the driving direction and the driving amount can be preset in advance in the micro-drive controller, optionally, if the difference is positive, then the motor is driven to move to the right, and if the difference is negative, the motor is driven to move to the left. In the implementation of this method, due to the servo calculation and transmission period of the motor system, the micro-drive unit does not drive in the first transmission cycle, but performs the i-1th drive in the i-th transmission cycle. Specifically, in the i-th transmission cycle, the difference between the driving amount limit value of the micro-drive unit to the motor mover and the front drive amount and the relationship of the actual tracking error $e_i$ of the motor mover determine the actual compensation of the driving amount $D_i$. When the value of $e_i$ exceeds the driving amount limit value of the micro-drive unit and the driving value of the i-1th driving, then the amount that can be driven in the ith transmission cycle is the limit value $D_{max}$ or $D_{min}$; or, the amount that can be driven in the ith transmission cycle is the sum of the i-1th driving amount $D_{i-1}$ plus the ith tracking error value $e_i$.

After the compensation of micro-drive unit, the tracking error value $e_i$ of motor mover is reduced. If the tracking error $e_i$ after the compensation is directly feed back to the motor controller, it will cause the electromagnetic thrust fluctuation of the motor, and the motion state of the workbench will be unstable, that is, coupling interference will be generated. In order to stabilize the motion of the motor, the corrected tracking error after the displacement compensation is required to feed back to the motor controller. Wherein, the step of correcting the tracking error of the motor mover after the displacement compensation specifically includes:

$$E_i(e_i) = \begin{cases} e_i & i \leq 2 \\ e_i + D_{i-2} & i > 2 \end{cases}$$

Wherein, $E_i(e_i)$ is the feedback error which is corrected and feed back to the motor controller in the i-th transmission cycle.

In the implementation of this method, for the first two transmission cycles (i≤2), the feedback error of the motor controller is equal to the tracking error $E_i(e_i)=e_i$. When i>2, the feedback error of the motor controller is the sum of the tracking error and the current driving amount of the micro-drive unit.

As above, the motor tracking error reduction method based on micro-drive unit is provided in this embodiment takes the motor mover as the working output end, and after the position information feedback of the motor mover is received by the micro-drive controller, the micro-drive controller controls the micro-drive unit to compensate the displacement of the motor mover, and feeds back the corrected tracking error after the displacement compensation to the motor controller, which solves the the problems of large tracking error and coupling interference in the prior art. Besides, the macro-micro stage in the present application uses the single position feedback to greatly reduce the cost of sensor detection.

Embodiment 2

Figure 4:
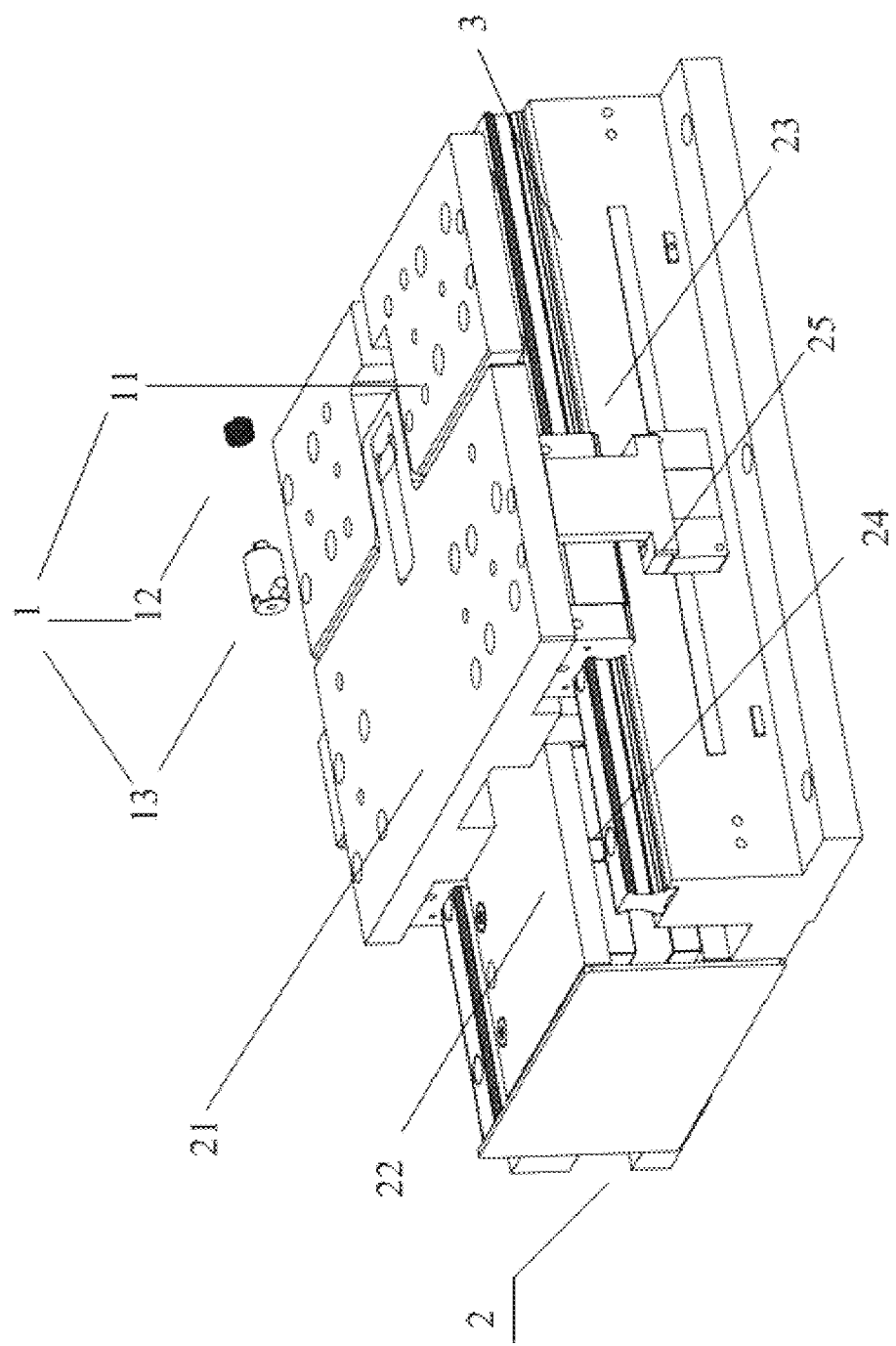
FIG. 4 is a schematic diagram of the implementation device of the motor tracking error reduction method based on the micro-drive unit provided in the second embodiment of the present disclosure.

Referring to FIG. 4, the second embodiment provides an implementation device based on micro-drive unit, which is configured to realize the motor tracking error reduction method in the first embodiment, specifically including a base 3, a micro-drive unit 1, a motor assembly 2, a micro-drive controller (not shown) connected to the micro-drive unit 1, a motor controller (not shown) connected to the motor assembly 2 and a sensor 23 installed on the base 3, the micro-drive unit 1 and the motor assembly 2 are both arranged on the base 3. The motor assembly 2 includes a motor mover 21, wherein a workpiece is placed on the the motor mover 21, and the sensor 23 is configured for feeding back a position information of the motor mover 21 to the micro-drive controller. The micro-drive controller controls the micro-drive unit 1 to carry out a displacement compensation of the motor mover 21, and feeds back the compensated tracking error of the motor mover to the motor controller.

In an optional embodiment, the micro-drive unit 1 includes a piezoelectric actuator 13, an elastic component 12 and an auxiliary mass block 11. The elastic component 12 is arranged between the motor mover 21 and the auxiliary mass block 11, the piezoelectric actuator 13 is respectively connected to the motor mover 21 and the auxiliary mass block 11, and the piezoelectric actuator 13 is configured for displacement compensation of the motor mover 21. optionally, the piezoelectric actuator 13 is a piezoelectric ceramic actuator. Optionally, the elastic component 12 is spring, elastic rubber and other elastic parts, and the high stiffness spring with high stiffness is preferred. A pretightening force is preset for the high stiffness spring to press the piezoelectric ceramic actuator onto the motor mover 21. When the driving amount is confirmed by the micro-drive controller, the length of the piezoelectric ceramic actuator is lengthened or shortened by changing the voltage of the piezoelectric ceramic actuator, such that the length of the piezoelectric ceramic actuator changes, and a driving force acts on the elastic component 12, then the motor mover 21 and the auxiliary mass block 11 is to move, and the motor mover 21 is moved to the predetermined position, thus realizing the displacement compensation of the motor mover 21, so that the motor mover 21 achieves high position accuracy.

In an optional embodiment, the sensor 23 is an absolute grating ruler. In addition, the base 3 is also provided with an absolute grating encoder for measuring the displacement value of the motor mover 21.

In an optional embodiment, the motor assembly 2 also includes a guide rail 24, a sliding block and a motor stator 22. The sliding block is slidably installed on the guide rail 24, and the motor mover 21 and the micro-drive unit 1 are arranged on the sliding block. Macro motion and micro motion share the same motor stator 22, and the motor mover 21 and micro-drive unit 1 realize different travel motions, which has a simple structure and simplifies the production process.

In conclusion, according to the method and device of the embodiment of the disclosure, the position information is feed back by the sensor 23, and the micro-drive controller receives the information and makes a response, controls the micro-drive unit 1 to compensate the displacement of the motor mover 21, and feeds back the corrected tracking error to the motor controller to realize the normal operation of the motor, which simplifies the structure of the motor, reduces the motor tracking error, and improves the accuracy of the motor. In addition, the single position feedback is adopted to reduce the production cost.

As mentioned above, the above embodiments are only used to illustrate the technical solutions of the present disclosure, not to restrict them; although the present disclosure has been described in detail with reference to the above-mentioned embodiments, those skilled in the art should understand that it can still modify the technical solutions recorded in the above-mentioned embodiments or replace some of the technical features equally; and these modifications or replacement, the essence of the corresponding technical solutions does not deviate from the spirit and scope of the technical solutions of each embodiment in the present disclosure.

What is claimed is:

1. A motor tracking error reduction method based on micro-drive unit, comprising
providing a motor mover as a working output end, and feeding back a position information of the motor mover to a micro-drive controller in real time by a sensor;
controlling, by the micro-drive controller, a micro-drive unit to carry out a displacement compensation for the motor mover;
correcting a tracking error of the motor mover after the displacement compensation, and feeding back the corrected tracking error information to a motor controller.

2. The motor tracking error reduction method based on micro-drive unit according to claim 1, wherein the step of controlling, by the micro-drive controller, a micro-drive unit to carry out displacement compensation for the motor mover comprises determining a driving direction and a driving amount of the micro-drive unit, and the micro-drive unit comprises a piezoelectric actuator; extending or shortening a length of the piezoelectric actuator to carry out the displacement compensation to the motor mover according to the determined driving direction and the driving amount.

3. The motor tracking error reduction method based on micro-drive unit according to claim 2, wherein the driving amount is calculated by a following formula:

$$D_i = \begin{cases} 0, & \text{if } i = 1 \\ D_{i-1} + e_i, & \text{if } i \neq 1 \text{ and } (D_{min} - D_{i-1}) \leq e_i \leq (D_{max} - D_{i-1}) \\ D_{max}, & \text{if } i \neq 1 \text{ and } e_i \geq (D_{max} - D_{i-1}) \\ D_{min}, & \text{if } i \neq 1 \text{ and } e_i \leq (D_{min} - D_{i-1}) \end{cases}$$

wherein, $D_i$ is the i-th driving of the micro-drive unit to the motor mover, $e_i$ is the sampling error of the i-th transmission cycle, $D_{max}$ is the maximum driving amount of the micro-drive unit to the motor mover, and $D_{min}$ is the minimum driving amount of the micro-drive unit to the motor mover.

4. The motor tracking error reduction method based on micro-drive unit according to claim 3, wherein the step of correcting the tracking error of the motor mover after the displacement compensation comprises $$E_i(e_i) = \begin{cases} e_i & i \leq 2 \\ e_i + D_{i-2} & i > 2 \end{cases}$$

wherein, $E_i(e_i)$ is the corrected feedback error of the motor controller in the i-th transmission cycle.

5. An implementation device of motor tracking error reduction method based on micro-drive unit, comprising a base, a micro-drive unit, a motor assembly, a micro-drive controller connected to the micro-drive unit, a motor controller connected to the motor assembly and a sensor installed on the base, the micro-drive unit and the motor assembly are both arranged on the base;
the motor assembly comprises a motor mover, wherein the sensor is configured to feed back a position information of the motor mover to the micro-drive controller;
the micro-drive controller controls the micro-drive unit to carry out a displacement compensation of the motor mover, and feeds back the compensated tracking error of the motor mover to the motor controller.

6. The implementation device of motor tracking error reduction method based on micro-drive unit according to claim 5, wherein the micro-drive unit comprises a piezoelectric actuator, an elastic component and an auxiliary mass block, the elastic component is arranged between the motor mover and the auxiliary mass block, the piezoelectric actuator is respectively connected to the motor mover and the auxiliary mass block, and the piezoelectric actuator is configured for the displacement compensation of the motor mover.

7. The implementation device of motor tracking error reduction method based on micro-drive unit according to claim 5, wherein the sensor is an absolute grating ruler.

8. The implementation device of motor tracking error reduction method based on micro-drive unit according to claim 5, wherein the motor assembly further comprises a guide rail, a sliding block and a motor stator, the sliding block is slidably installed on the guide rail, and the motor mover and the micro-drive unit are arranged on the sliding block.

9. The implementation device of motor tracking error reduction method based on micro-drive unit according to claim 7, wherein the base is further provided with an absolute grating encoder.

10. The implementation device of motor tracking error reduction method based on micro-drive unit according to claim 6, wherein the piezoelectric actuator is a piezoelectric ceramic actuator.

* * * * *